United States Patent [19]

DeLong et al.

[11] Patent Number: 4,908,098

[45] Date of Patent: Mar. 13, 1990

[54] METHOD FOR EXTRACTING THE CHEMICAL COMPONENTS FROM DISSOCIATED LIGNOCELLULOSIC MATERIAL

[75] Inventors: Edward A. DeLong; Edward P. DeLong, both of Sherwood Park; George S. Ritchie, Winterburn; W. Alan Rendall, Calgary, all of Canada

[73] Assignee: Tigney Technology Inc., Canada

[21] Appl. No.: 339,917

[22] Filed: Apr. 18, 1989

Related U.S. Application Data

[63] Continuation of Ser. No. 55,142, May 27, 1987, abandoned.

[30] Foreign Application Priority Data

May 29, 1986 [CA] Canada ................................... 510262

[51] Int. Cl.$^4$ .......................... C07G 1/00; D21C 3/02; D21C 3/20; D21C 3/26
[52] U.S. Cl. ...................... 162/16; 162/21; 162/60; 162/77; 162/90; 530/500; 530/507
[58] Field of Search ................. 162/72, 77, 19, 60, 162/90, 21, 22, 247, 14, 16, 22, 247; 127/37; 426/447, 449, 635, 636, 426, 431, 439; 530/500, 507

[56] References Cited

U.S. PATENT DOCUMENTS

| | | | |
|---|---|---|---|
| 4,100,016 | 7/1978 | Diebold et al. | 162/77 |
| 4,496,426 | 1/1985 | Baumeister et al. | 162/77 |
| 4,511,433 | 4/1985 | Tournier et al. | 162/72 |
| 4,520,105 | 5/1985 | Sinner et al. | 162/19 |
| 4,645,541 | 2/1987 | DeLong | 162/21 |

FOREIGN PATENT DOCUMENTS

| | | | |
|---|---|---|---|
| 51-7204 | 7/1974 | Japan | 162/77 |
| 2000822 | 1/1979 | United Kingdom | 162/21 |
| 2040332 | 5/1980 | United Kingdom | 162/77 |

OTHER PUBLICATIONS

Green et al.; "Alkaline Pulping in Aqueous Alcohols and Amines"; Tappi, May 1982, vol. 65, No. 5, p. 133.
April et al.; "Prehydrolysis Achieves Higher Organosolv Delignification"; Tappi, Feb. 1982, vol. 65, No. 2, p. 41.

*Primary Examiner*—Steve Alvo
*Attorney, Agent, or Firm*—Griffin, Branigan & Butler

[57] ABSTRACT

The chemical components of lignocellulosic material that have been dissociated by a stream explosion process can be extracted from the mixture of components using a solvent extraction process. The dissociated lignocellulosic material is put in a column and the substances which are soluble in water, alcohol and caustic are leached out of the mixture by solvent extraction with relatively small volumes of those solvents. No agitation is used. Substantially pure cellulose remains in the column and it can be bleached before removal from the column.

13 Claims, No Drawings

METHOD FOR EXTRACTING THE CHEMICAL COMPONENTS FROM DISSOCIATED LIGNOCELLULOSIC MATERIAL

This application is a continuation of Ser. No. 055142, filed May 27, 1987, now abandoned.

FIELD OF THE INVENTION

Lignocellulosic materials can be rendered separable into their constituent components by a steam explosion process. This explosion process comprises the following steps: (1) packing the lignocellulosic materials in a divided, exposed, moist form in a pressure vessel having a valved outlet; (2) with the valve closed, rapidly filling the pressure vessel with steam at a pressure of at least 500 psi to bring substantially all of the lignocellulosic material to a temperature in the range 185° C. to 240° C. in less than 60 seconds to thermally soften the lignocellulosic material into a plastic condition; and (3) as soon as the plastic condition has been attained, opening the valved outlet and instantly and explosively expelling the lignocellulosic material from the pressure vessel to atmosphere. This explosion process breaks the chemical crosslinks between the lignin and hemicellulose and produces a mixture of chemical substances. This mixture, referred to in this specification as "dissociated lignocellulosic material" contains cellulose and substances which are soluble in water, alcohol or caustic, and insoluble colouring matter. The steam explosion process is further described in Canadian Pat. Nos. 1,096,374, 1,141,376 and 1,217,765, to DeLong, and the apparatus used in the process is illustrated and described therein.

Because the degree of polymerization of the hemicellulose has been drastically reduced during this process, a significant portion of the xylan polymer has been converted to xylose and xylose oligomers which are water soluble. In some lignocellulosic materials, such as hardwoods, bagasse and straw, which contain hemicelluloses substituted with esters, such as acetate, the steam explosion process results in some ester hydrolysis which frees the acid. The lower molecular weight acids, such as acetic acid, are miscible with, or soluble in, water. Other water-soluble components of dissociated lignocellulosic material include low molecular weight lignin components such as vanillin and syringaldehyde, plant protein, furfural, and inorganic salts.

Alcohol-soluble substances present in dissociated lignocellulosic material include lignin, fatty acids, steroids and various strongly-coloured substances.

Caustic-soluble substances include high molecular weight lignin of pseudolignin, high molecular weight xylan and some colouring matter.

SUMMARY OF THE INVENTION

This invention is directed to a method of separating from the dissociated lignocellulosic material the water-soluble substances, the alcohol-soluble substances, the caustic-soluble substances and the cellulose. The substances dissolved in the water, alcohol and caustic fractions may then be isolated by various standard processes, including distillation, reverse osmosis, ultrafiltration, precipitation and solvent extraction.

It is cheaper and easier, and simplifies the subsequent product isolation procedures, if the substances that are soluble in water, alcohol and caustic can be extracted in relatively small volumes of these solvents, and it is an object of this invention to achieve extraction of a large proportion of the substances using only small volumes of solvents.

The method of extracting the chemical compounds from dissociated lignocellulosic material comprises placing the material in a column having an upper and a lower opening, adding the selected solvent through the top opening, and, without agitating the contents of the column, allowing the solvent to percolate down through the dissociated lignocellulosic material, under the force of gravity, and then removing the solvent and dissolved substances through the lower opening of the column. Normally, a head of solvent is maintained above the level of the material in the column. Usually the level of the head should be kept constant to maintain a steady flow rate. Head levels up to double the height of the particulate material have been successfully used. In general, the higher the head level, the faster the flow rate will be.

In some instances a column may run faster than is required to maintain the proper contact time with the solvent or with a reagent. In this case, a valve which controls the rate of flow can be installed in the eluant outlet line to restrict the rate of flow. Alternatively, if an increased flow is desired, a high head can be maintained on the column which can be drawn off by a probe inserted just above the material, when the proper total flow through the material has been achieved.

Temperature sensors and pH sensors are installed in the eluant line to monitor the status of the column. The data from these sensors together with flow rate meters and load cells are used to regulate and control the status of the column.

Although any one or two of the selected solvents can be used alone, in a preferred embodiment of the invention the water, alcohol and caustic solvents are used in succession, each solvent being permitted to percolate down to the level of the dissociated lignocellulosic material before the next solvent is added. Substantially pure cellulose is left in the column after this treatment, which may be bleached in the column by a suitable bleach, such as aqueous sodium hypochlorite. Alternatively, the cellulose may be transferred to another vessel for bleaching by conventional means.

It has been found that this extraction method permits the water, alcohol and caustic soluble substances to be extracted in relatively small volumes of these solvents, unlike conventional pulping methods, which require very large volumes. In conventional pulping operations, column technology is unsuccessful because the pulp is agitated at high temperatures and in high concentrations of caustic which causes the pulp to swell markedly. Once swollen, the heavily swollen pulp resists leaching in a column, particularly if it is agitated, and will often blind off completely in a column using gravitational force alone. The steam explosion process, however, does not swell the cellulose. If it is placed in a column, the dissociated lignocellulosic material does not swell unless it is agitated by stirring or bubbling gas into it. This is an important difference between conventional pulping which requires high heat, higher concentrations of chemicals and agitation, to react with the unwanted lignocellulosic components to render them soluble in water. Because the lignin/xylan crosslinks are severed during the explosion, the resulting dissociated lignocellulosic material will extract easily without agitation using non-reactive solvents, which do not promote swelling.

DETAILED DESCRIPTION OF THE INVENTION

The extractor column has an upper opening through which solvent can be added and the dissociated lignocellulosic material put into the column, and a lower opening for the removal of the eluant. (In this specification, "eluant" means a solvent with its dissolved or suspended materials, which is removed from the column.) The column can conveniently be a generally vertical cylinder or rectangular tube, open at the top and having a drainage system at the bottom, leading to separate lines and vessels for recovering the water, alcohol and caustic eluants. The column can be filled to various heights with dissociated lignocellulosic material. The inventors have obtained good results with a five foot high column of material, but heights of material from one foot to over twenty feet have been used successfully.

Water occurs naturally in the lignocellulosic material and more is added by absorption during the first stage of the explosion process. Hence, the water-soluble fraction of the dissociated lignocellulosic material is already dissolved in the water in the material. Removal of the water solubles by conventional pulp washing techniques would involve a nearly complete solvent exchange by massive dilution of the solution already present, with very large volumes of water or other solvents or reagents. In the method described herein, the moist dissociated lignocellulosic material is transferred to a column. Packing or compressing of the material in the column hampers solvent flow and is therefore to be avoided. Water is then added to the column. The fluid percolates down through the bed in a plug flow, pushing the slug of connate water containing the water solubles ahead of it. The solution which exists at the bottom of the column is initially very concentrated, but, because not all channels for fluid flow are swept by the incoming fluid at the same rate due to their different pore or channel sizes, perfect plug flow is not realized and the concentration of dissolved matter falls off exponentially. Water extractable substances comprise approximately 25% by weight of the dissociated lignocellulosic material (on a dry basis).

For a five foot high column of loosely filled dissociated lignocellulosic material, more than 99 percent of the water solubles can be removed with only two column volumes of water, whereas conventional solvent exchange by dilution techniques would require 15-30 times as much solvent to remove the same amount of water solubles. A further increase in efficiency can be achieved if only the most concentrated portion of the eluant is used for recovery of the soluble substances. For example, the first 20% of the eluant contains typically 80% of the water solubles. The remaining 80%, for example, of the eluant can be used as the first portion of the water wash of a subsequent column. The last 20% of the water passed through the subsequent column would be clean water to make up the desired total volume, and so on for further columns. In this manner, solvent requirements can be further reduced by a factor of 5.

At no time while the dissociated lignocellulosic material resides in the column is any form of agitation (such as stirring, removal from the column, tumbling or back flushing with liquid or gas) to be applied until after the bleaching cycle has been completed. One reason for this is that the cellulose will undergo swelling in hydrophilic solvents when agitated. No appreciable swelling occurs during the steam explosion process, however, due to the minimal amount of moisture present. If the dissociated lignocellulosic material is agitated at any stage of the extraction process, the volume occupied by the material increases dramatically due to swelling and the flow rates through the column are reduced to below operationally acceptable levels. In fact, flow may no longer be possible under gravitational influence alone.

Neither pressure not suction should be applied to the column, since this can compress the dissociated lignocellulosic material. Dissociated lignocellulosic material is highly compressible, and once compressed, the channels and pores through which solvents can flow are collapsed, reducing or preventing flow.

The water fraction (that is, the eluant produced when water is passed through the column) is removed through the lower opening of the column and can be collected. It can then be processed using standard techniques, such as solvent extraction, fractional distillation and reverse osmosis, to isolate the desired substances, as discussed below.

After water-washing of the column, the solvent is changed to alcohol. Any of numerous lower molecular weight alcohols can be used, including methanol, ethanol, propanol and isopropanol. The alcohol can contain some water, for example 5%-30% by volume. Again, with a five foot column of dissociated lignocellulosic material, two column volumes of alcohol are sufficient to extract more than 90% of the alcohol-soluble material.

When flow first commences the initial eluant is water from the previous wash, which can be added to the previous aqueous eluant. Because of the turbulent flow through the pores or channels and the miscibility of the alcohol and water, some mixing of these solvents occurs and solids initially dissolved in the alcohol may precipitate, typically when the water content of the mixture at a given point rises above about 30%. As the front moves through the bed and the alcohol content rises, this precipitated material is redissolved. A concentrated solution of alcohol-solubles then advance through the bed in plug-like flow. At the alcohol-water interface, the precipitate tends to block the pores or channels in the material causing the flow for alcohols to be slower than for water. Due to the presence of suspended solid materials, the alcohol-water mixture appears turbid, so when the beginning of this turbidity is detected, the flow to the water solution line is stopped and the fluid flow is directed to the alcohol solution line. Mixing of the water and alcohol solvents can be minimized by allowing the water to be drained out of the column before adding the alcohol.

Concentration of the solubles in the eluting solution increases to a maximum and then decays exponentially. Typically, less than one column volume of alcohol eluant contains more than 80% of the alcohol solubles, so the second volume may be used as the first wash of alcohol in the next column and so on, to reduce the amount of solvent required.

The alcohol fraction is collected and the solutes isolated by various standard processes, as discussed below.

Following the alcohol wash, a caustic solution is used to wash the material remaining in the column. This permits the recovery of high molecular weight lignin or pseudolignin, and high molecular weight xylan, which are soluble in the caustic. Also, it leaves substantially pure cellulose in the column, which is suitable for low xylan content applications. In a five foot column, two column volumes of caustic can be used to accomplish this extraction.

Some caustics, such as sodium hydroxide, cause substantial swelling of the cellulose at some operational concentrations and are to be avoided, since swelling slows the flow of caustic solution through the column. Caustics such as potassium hydroxide which cause less swelling at operational concentrations are preferred. For the same concentration, potassium hydroxide solutions will run about four times faster than those of sodium hydroxide. At this stage of the process, some heat can be used to improve the efficiency and flow rate of the solvent, because the delicate and easily degraded lignin has already been extracted in the alcohol. Caustic concentrations in the range of about 0.1 to 8 percent by weight and a temperature up to about 65° C. have been found to produce satisfactory results.

The caustic fraction can be collected and the solutes isolated, as discussed below.

In one embodiment of the invention, the alcohol extraction step is omitted, and the water wash is followed directly by the caustic wash. The lignin is then recovered from the caustic solution. This permits the recovery from the caustic eluant of a higher molecular weight, thermosetting form of lignin.

In another embodiment, the dissociated lignocellulosic material remaining in the column after water and alcohol washes can be bleached directly for applications such as paper making, where one wishes to leave the xylan in with the cellulose to improve the binder capability of the resulting holocellulose.

In another embodiment of the invention, after the alcohol washing, the column is washed with warm water to displace, and thereby recover, the alcohol from the holocellulosic residue prior to caustic washing or bleaching. This displaced alcohol may contain more lignin which was trapped by capillary forces in the holocellulosic pores or channels, prior to water wetting. An increased yield of alcohol-soluble lignin is therefore achieved and alcohol recovery is simplified.

The temperature of the solvents used for leaching out soluble matter is usually room temperature (about 25° C.) The flow rate of solvents through the column is temperature dependent, and too low a temperature will reduce or stop the flow altogether. Too high a temperature will cause solvents such as methanol to boil, and may also be detrimental to the chemically delicate compounds which are present, such as lignin. In the water and alcohol extraction stages, no additional heat is required. However, satisfactory results have been obtained with water and alcohol temperatures up to about 40° C.

After the water, alcohol and caustic washes, substantially pure cellulose remains in the column. For some lignocellulosics, it is possible to rapidly bleach the remaining cellulose pulp before removal from the column. However, if desired, the pulp may be transferred from the column to a conventional bleaching system to carry out the bleaching operation.

Because the chemically delicate components have already been extracted, bleaching may be performed at elevated temperatures, for example, up to about 80° C., since this speeds up the bleaching process. One typical bleach used is hypochlorite (sodium or calcium) at a concentration in the range 0.25 to 3%. A concentration of 0.5 to 2% is optimal for generating by exothermic reaction the heat required to maintain the preferred temperature at the bleach interface. Regardless of what bleaching process is chosen, it is often useful after the caustic wash to do a limited wash of the contents of the column with warm water (up to about 60° C.), as this will remove a lot of colour and make the bleaching process simpler and cheaper. It is important, however, to leave most of the caustic in the column to maintain a high pH for the hypochlorite bleaching. Once the cellulose has been bleached it must be thoroughly washed with water to remove salts. Acids which will evaporate on drying the cellulose (typically hydrochloric acid or acetic acid) can be used to neutralize residual, unused bleach on the cellulose, to neutralize the caustic, and to improve the brightness of the cellulose pulp. All acids tested ran well in the column even though the cellulose volume shrinks after water-washing, alcohol-washing, caustic-washing and bleaching. To illustrate the significance of this observation, consider the conversion of this bleached cellulose into cellulose acetate. This process requires as a first step that all of the water be removed by replacing it with glacial acetic acid, preparatory to reacting it with acetic anhydride. Displacement of the water from the cellulose on the column by acetic acid is simple, rapid and cheaper than the dilution methods currently used.

In one embodiment of the invention, the dissociated lignocellulosic material is water-washed and alcohol-washed, but not caustic-washed. The cellulosic pulp remaining in the column in this case contains xylan and is therefore a desirable filler and binder in some paper-making applications. In this case, more bleach is required than when caustic is used to wash the cellulose, in order to break down the high molecular weight lignin which has not been leached out by caustic from the cellulose.

Although the method described above involves the use of two or three of the solvents (water, alcohol or caustic), the invention is also directed to the use of any one or combination of these solvents without the use of the others. Obviously, if it is desired to extract from dissociated lignocellulosic material only substances that are soluble in any one of these solvents, then that solvent alone can be used in the manner described, without using the other two.

EXTRACTION OF SOLUBLES FROM THE WATER FRACTION

Isolation of components from the water fraction can be carried out by standard processes which are within the knowledge of a wood chemist. For many applications, it is useful to use solvent extraction to separate the components into two broad groups. For instance, aromatic compounds such as furfural, vanillin, syringaldehyde and organic acids (typically acetic acid) can be extracted in a solvent such as dichloromethane. The other fraction comprising the sugars, proteins and inorganic salts, remains in the water.

In this procedure, after removal of the protein, by ultra-filtration or other means to prevent rag, the water fraction is fed into the lower portion of a suitable packed liquid-liquid extractor column containing a dense extracting liquid having a low boiling point and which is substantially insoluble in or immiscible with water, such as dichloromethane. The water fraction then rises to the surface of the column by density difference, and an aqueous solution is removed from the top. Fractional distillation of the dichloromethane solution, which runs counter-current to the water solution, permits the isolation and recovery or aromatic substances and organic acids, such as acetic acid, which have dissolved in the dichloromethane during passage of the water fraction through it.

The aqueous solution may be concentrated by distillation or "reverse osmosis" (high pressure ultrafiltration). The concentrate has a number of uses: it can be used as an animal feed molasses or as a fermentation substrate to produce ethanol for liquid fuels and yeast as a protein source for feed or food and other products; it can be digested in strong acid to produce furfural or polyfurfural, or the xylose sugars can be cleaned up and hydrolyzed to monomers with weak acid and thence converted by reduction to xylitol, which is a low caloric, anti-cariogenic sweetener for human consumption.

EXTRACTION OF SOLUBLES FROM THE ALCOHOL FRACTION

The alcohol fraction can be concentrated, typically by distillation or reverse osmosis or both. The concentrate is added to water, typically 3-5 volumes, to precipitate the crude lignin as a solid. The crude lignin so precipitated has a particle size of less than one micron, which makes it difficult to filter with simple technology, because both solvent and solids pass through filter paper of all pore sizes commercially available. It can be recovered by flocculating the particles by the addition of acid, typically to less than a pH of 4, or by the addition of salts, such as calcium chloride or sodium chloride, in concentration of 0.1 to 1 percent. When salt is used to floculate the lignin, the lignin floats to the surface of the brine initially, but on standing for extended periods of time (typically one week), portions will gradually sink to the bottom. When acid is used, the lignin promptly sinks to the bottom of the liquid. Trivalent metal ion salts, such as $FeCl_3$ (ferric chloride), are to be avoided, because of potential oxidation of the lignin.

It is possible, using a combination of solvent extractions, reverse osmosis and chromatographic techniques to fractionate the floculated lignin into a sulfur-free thermosetting lignin fraction having a melting range of 170° to 190° C. and a thermoplastic lignin fraction having a melting range of 130°-150° C., and further to isolate fatty acids, steroids and other highly coloured substances.

EXTRACTION OF SOLUBLES FROM THE CAUSTIC FRACTION

The solubles in the caustic fraction can be extracted by first adjusting the pH of the fraction to less than 4, causing floculation. For complete floculation to occur, it is necessary to heat the acidified solution, for example by injecting steam, to about 50°-80° C. The soft globular solid is collected by filtration and dried. If the extraction process used involved an alcohol-wash step, then the caustic soluble product obtained is a high molecular weight lignin and pseudolignin containing some xylan. The mixture is black to dark brown and has a melting point greater than 250° C. If no alcohol wash was carried out, then the lignin and pseudolignin product obtained has a higher average molecular weight than that obtained if an alcohol wash was used, and has a melting point in the range 170°-200° C. and is thermosetting.

It is also possible if no alcohol wash was carried out to collect the lignin that is in the caustic fraction without the application of heat by acidifying to a pH less than 4, decanting the water and filtering the resulting gel. The residue is then washed with water and dried. The lignin thus produced has typically half the average molecular weight of that obtained when heat has been used. It is thermosetting and has a melting point in the range of 150°-170° C. Because it is thermosetting, it is suitable for resin and binder applications.

The lignin obtained by caustic extraction without prior alcohol washing of the dissociated lignocellulosic material can be fractionated by the following procedure. The aqueous filtrate can be extracted by dichloromethane to recover low molecular weight aromatic compounds. This solution is used to dissolve from the dried caustic residue a further portion which is dichloromethane-soluble. This soluble fraction, on removal of the solvent, is the thermoplastic fraction of the lignin, and has a typical melting range of 130°-150° C. It can be converted to thermosetting material by the action of strong acids. The most reactive thermosetting fraction is obtained by taking the dichloromethane-insoluble residue and extracting it with alcohol, and then removing the alcohol from the soluble portion. The final residue has the highest average molecular weight and is largely inert, but can act as a filler material in resins or adhesives.

What is claimed is:

1. A method of extracting chemical components from dissociated lignocellulosic material with small volumes of solvent comprising:
   (a) placing said dissociated lignocellulosic material to a predetermined height in a column having an upper opening and a lower opening;
   (b) adding water through said upper opening and, without agitating the contents of the column, permitting said water to percolate down through said dissociated lignocellulosic material in a plug flow and dissolve water-soluble substances;
   (c) removing said water and dissolved substances through said lower opening;
   (d) adding a suitably selected alcohol through said upper opening and, without agitating the contents of said column, allowing said alcohol to percolate down through said dissociated lignocellulosic material and dissolve alcohol-soluble substances;
   (e) removing said alcohol and dissolved substances through said lower opening;
   (f) adding a dilute aqueous caustic solution which will not swell the said dissociated lignocellulosic material sufficient to impede the flow of said caustic solution through said upper opening and, without agitating the contents of the column, permitting said caustic solution to percolate down through said dissociated lignocellulosic material in a plug flow and dissolve substances in said caustic solution; and
   (g) removing said caustic solution and dissolved substances through said lower opening; and wherein the said water, said alcohol and the said caustic solution are at a temperature of 65° C. or less and a head of each is maintained during said adding steps (b), (d) and (f) such that the head is at least above the level of the said material in the column and the column is substantially unpressurized, and wherein no more than about 2 column volumes of said water, alcohol and caustic solution are used for said extractions.

2. A method according to claim 1 comprising the additional step of collecting at least one of said removed solutions and isolating at least one of said substances dissolved therein.

3. A method according to claim 1, wherein said caustic solution is a solution of potassium hydroxide.

4. A method according to claim 3, wherein the concentration of said potassium hydroxide solution is in the range 0.1 to 8 percent by weight.

5. A method according to claim 1, wherein said alcohol is selected from the group comprising methanol, ethanol propanol and isopropanol.

6. A method according to claim 1, wherein said caustic solution is heated to a temperature in the range of 25°–65° C. prior to being added to the column.

7. A method according to claim 1, wherein, following the removal of said alcohol solution, and prior to the addition of said caustic solution, water is added through said upper opening and permitted to percolate down through the contents of the column to push the residual alcohol from said column, and the mixture of water and alcohol is recovered through said lower opening.

8. A method according to claim 1 comprising the additional steps, following said removal of said caustic solution, of:
   (1) adding bleach through said upper opening and permitting it to percolate in a plug flow down through and bleach the material remaining in the column; and
   (2) removing the bleach waste through said lower opening.

9. A method according to claim 8 comprising the additional steps, following step (2), of:
   (1) adding water again through said upper opening and, without agitating the contents of the column, permitting said water to percolate down through the contents of said column to displace the bleach;
   (2) removing said water through said lower opening;
   (3) adding a suitably selected acid through said upper opening and, without agitating the contents of the column, permitting said acid to percolate down through the bleached contents of the column, neutralizing the residual caustic, destroying excess bleach and increasing pulp brightness; and
   (4) washing the contents of the column with water to remove residual salts and acid.

10. A method according to claim 1, wherein the rate of flow through the column is controlled by a flow control valve below the lower opening in the column.

11. The method of claim 1, wherein said head is up to twice the height of the said material in the column.

12. The method of claim 11, wherein the height of the said material is up to 20 feet.

13. The method of claim 1 wherein the said dissolved substances in the caustic solution is lignin and the said lignin is isolated from the caustic solution.

* * * * *